US009298622B2

(12) United States Patent
Jacobs et al.

(10) Patent No.: US 9,298,622 B2
(45) Date of Patent: *Mar. 29, 2016

(54) AFFINITY GROUP ACCESS TO GLOBAL DATA

(71) Applicant: International Business Machines Corporation, Armonk, NY (US)

(72) Inventors: Stuart Z. Jacobs, Lakeville, MN (US); David A. Larson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 313 days.

This patent is subject to a terminal disclaimer.

(21) Appl. No.: 13/779,912

(22) Filed: Feb. 28, 2013

(65) Prior Publication Data
US 2014/0244940 A1    Aug. 28, 2014

(51) Int. Cl.
*G06F 12/00* (2006.01)
*G06F 12/08* (2006.01)
*G06F 9/00* (2006.01)
*G06F 3/06* (2006.01)

(52) U.S. Cl.
CPC .............. *G06F 12/0815* (2013.01); *G06F 9/00* (2013.01); *G06F 3/0655* (2013.01)

(58) Field of Classification Search
CPC ....... G06F 12/08; G06F 12/0815; G06F 3/06; G06F 3/0655; G06F 9/00
USPC ......................................................... 711/162
See application file for complete search history.

(56) References Cited

U.S. PATENT DOCUMENTS

| 8,132,172 | B2 | 3/2012 | Li et al. |
| 8,392,661 | B1 | 3/2013 | Metcalf |
| 2003/0018738 | A1 | 1/2003 | Boylan et al. |
| 2005/0268106 | A1 | 12/2005 | Mansell et al. |
| 2007/0016754 | A1 | 1/2007 | Testardi |
| 2007/0150658 | A1 | 6/2007 | Moses et al. |
| 2010/0169895 | A1 | 7/2010 | Dice et al. |
| 2010/0251250 | A1 | 9/2010 | Kishan et al. |
| 2011/0125974 | A1 | 5/2011 | Anderson |
| 2012/0054429 | A1* | 3/2012 | Gupta ................... G06F 3/0604 711/114 |
| 2013/0097389 | A1 | 4/2013 | Suzuki et al. |
| 2014/0181421 | A1 | 6/2014 | O'Connor et al. |

OTHER PUBLICATIONS

Jacobs, et al. "Affinity Group Access to Global Data", filed Feb. 29, 2013.
U.S. Office Action for U.S. Appl. No. 13/780,188, Notification Date: Jun. 30, 2015, 14 pages.

* cited by examiner

*Primary Examiner* — Matthew Bradley
(74) *Attorney, Agent, or Firm* — Scott S. Dobson; Grant Johnson

(57) ABSTRACT

A method, system, and computer readable medium to share data on a global basis within a symmetric multiprocessor (SMP) computer system are disclosed. The method may include grouping a plurality of processor cores into a plurality of affinity groups. Global data may be copied into a plurality of group data structures. Each group data structure may correspond to an affinity group. The method may read a first group data structure by a thread executing on a processor core associated with a first affinity group.

7 Claims, 6 Drawing Sheets

AFFINITY GROUP ACCESS TO GLOBAL DATA

FIELD

This disclosure generally relates to management of multiprocessor computer systems, and in particular, to grouping processor cores to increase the efficiency of accessing data on a global basis.

BACKGROUND

The number of computational processor cores and processor chips in computer systems continues to increase. Symmetric multiprocessor (SMP) computer systems are scalable and may include 256 or more processor cores on a single communications fabric. SMP computer systems may implement a parallel processing model to take advantage of the multiple processors and access shared resources. Shared resources may include processors, memory, data in memory, co-processors, network bandwidth, or secondary storage.

SUMMARY

Embodiments of the disclosure provide a method, system, and computer-readable medium for sharing data on a global basis in a computer system.

In one embodiment, a method of a symmetric multiprocessing (SMP) computer system to share data on a global basis is described. The method may include grouping a plurality of processor cores into a plurality of affinity groups. The method may copy global data into a plurality of group data structures. In some embodiments the method creates hints about the global data in the plurality of group data structures. Each group data structure may correspond to an affinity group. The method includes reading a first group data structure corresponding to an affinity group by a thread executing on a processor core associated with a first affinity group.

In another embodiment, a system to share data on a global basis within a symmetric multiprocessor (SMP) computer system is described. The system may include a hypervisor for grouping a plurality of processor cores into a plurality of affinity groups. The hypervisor may copy global data into a plurality of group data structures. In some embodiments, the hypervisor may provide hints about the global data in the plurality of group data structures. Each group data structure may correspond to an affinity group. The system may read from a first group data structure with a thread executing on a processor core associated with a first affinity group.

Yet another embodiment is directed to a computer readable storage medium.

BRIEF DESCRIPTION OF THE DRAWINGS

Embodiments will be better understood from the following detailed description with reference to the drawings, in which.

Like reference numbers and designations in the various drawings indicate like elements.

DETAILED DESCRIPTION

Figure 1:
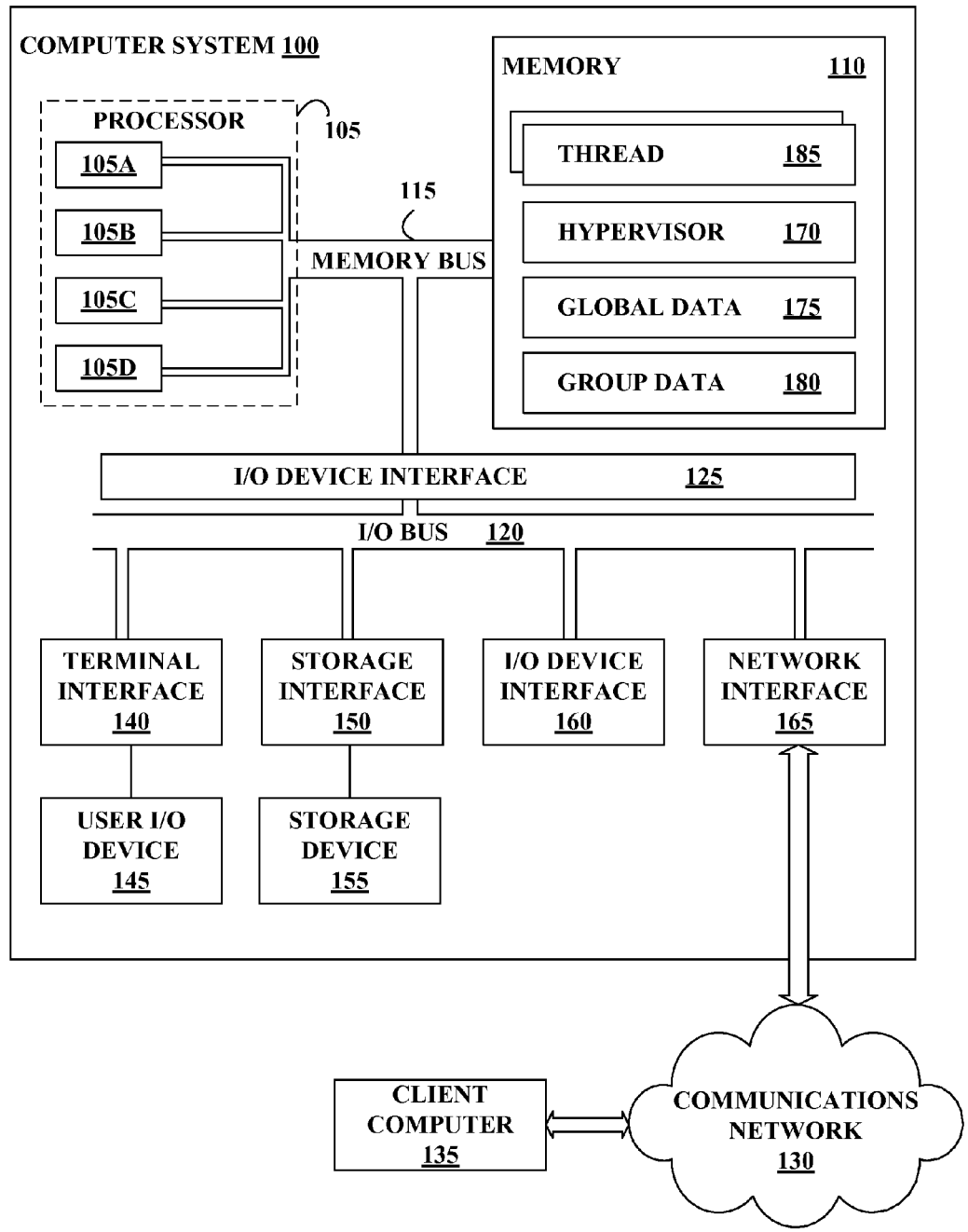
FIG. 1 illustrates a computer system configured to access data on a global basis, according to various embodiments.

According to embodiments of the disclosure, a plurality of processor cores are grouped into subsets of the plurality in a symmetric multiprocessor (SMP) computer system. The processor cores are grouped based on memory access latency and the performance of the cache coherency protocol. Group data structures that contain hints or direct copies of a global data are created, with each data structure corresponding to a group of processor cores. When a thread of execution reads data, the thread reads data from the group structure corresponding to the processor core on which it executes. If a condition exists that requires an update to the global data, a thread of execution will obtain a lock on the global data and update the global data. The thread of execution will then determine whether it needs to update the group data structures and update accordingly. Once the data is updated, the thread of execution releases the lock on the global data and continues doing other work.

Generally, SMP computer systems include a plurality of processors sharing one pool of memory. SMP computer systems may include a computer system with multiple processor cores and multiple chips housing these processor cores, and they may also include computer systems with multiple processor cores on a single processor chip. A feature of SMP computer systems is that processors share a pool of memory via a communications fabric, which may be a bus, switch, or other form of interconnect. SMP computer systems continue to increase in scale, with some SMP computer systems offering 256 or more processor cores on a single communications fabric. The communications fabric may also be referred to herein as the "SMP fabric." SMP computer systems may maintain coherency of data in memory by snooping every transaction on the SMP fabric. In systems of this magnitude, the SMP fabric may become a bottleneck and limit the performance of the entire SMP computer system if each processor core is snooping every transaction by the other processor cores.

The expansion of SMP computer systems has been achieved by reducing and limiting the scope of transactions on the SMP fabric when possible. For example, it may be possible to limit transactions to the scope of a single chip, a gathering of chips within some group smaller than the entire system, the entire system, or even the entire system plus remote systems that coherently attach to the fabric. In effect, the SMP computer systems begin to follow the non-uniform memory access (NUMA) architecture. In NUMA, memory access time corresponds to the location of the memory relative to a processor. For example, memory that is local to a processor may have a faster response time than memory that is local to another processor.

One of the characteristics of large-scale SMP fabrics is that as the number of parallel consumers of a piece of data increases, the ability of a producer to efficiently modify that data decreases. A "consumer" may include a thread of execution that is reading data from memory without modifying that data. A "producer" may include a thread of execution that is modifying data in memory. A thread of execution may function as a consumer at times and as a producer at other times. In these large-scale SMP systems, when the number of consumers is quite large, it may take numerous attempts on the SMP fabric, potentially costing thousands or even tens of thousands of cycles, before a particular producer is able to become the highest point of coherency for a particular piece of data and successfully modify the data.

In some embodiments, a plurality of processor cores may share data, referred to herein as global data. Global data may be modified less frequently than it is consumed or read. The global data may be stored in the memory of an SMP computer system. The plurality of processor cores may be grouped into affinity groups in order to read and write the data more efficiently.

In an SMP computer system that includes a plurality of processors, an "affinity group" may include one or more processors, each having one or more processor cores. In a single processor system having one or more processor cores, an affinity group may include a plurality of processor cores. In some embodiments, all of the processor cores on a chip are one affinity group. In other embodiments, all of the processor cores on the chips of a physical boundary or a logical boundary on the SMP fabric are one affinity group. The grouping of the processor cores may be in accordance with performance characteristics of the SMP fabric for modifying the shared data, e.g., memory access latency. Affinity groups may represent a subset of processor cores that provide acceptable performance if the processor core and the memory that the processor core accesses are within the same affinity group and less desirable performance if the processor core and the memory the processor core accesses are in different affinity groups. Affinity groups may additionally account for cache coherence latency. That is, affinity groups may represent a subset of processor cores that provide acceptable performance if the processor core and the cached version of some data are within the same affinity group and less desirable performance if the processor cores and the cached version of the data are in different affinity groups.

In some embodiments, sharing global data may require a locking primitive and a data structure for each affinity group. The group data structure may include a version of the global data, or a hint about what the global data contains. In other embodiments, the group data structure may be a direct minor of the global data. When a consumer only requires examining the global data, the consumer reads the group data corresponding to the affinity group of the processor core on which the consumer is executing to determine whether there is a need to obtain a lock on the global data and perform any updates to the global data. If it is determined that there is no need to modify the data, the consumer may continue doing other work. If the consumer (e.g., a thread of execution) has no other work, the processor core may continue doing work with other threads of execution. Conversely, if there is a need to modify the data a consumer may initiate operations to become a producer. When a producer is modifying the global data, the producer may obtain a lock protecting the global data. Because there are duplicate group data structures that reduce the number of threads of execution accessing the global data, the wait time to obtain the lock is reduced, thereby improving the overall performance of the SMP computer system by increasing the efficiency of sharing data. The lock on the global data serializes updates to the global data, ensuring that only one producer may update the global data at a time. The producer holding the lock updates the group data structures prior to releasing the lock, according to some embodiments.

FIG. 1 illustrates a computer system 100 configured to improve the efficiency of access to global data, according to various embodiments. The computer system 100 may be connected to one or more client computer systems 135 via a communications network 130. For the purposes of this disclosure, the computer system 100 may represent practically any type of computer, computer system, or other programmable electronic device, including, but not limited to, a client computer, a server computer, a portable computer, a handheld computer, or an embedded controller.

The computer system 100 may include, without limitation, one or more processors 105, memory 110, a terminal interface 140, a storage interface 150, an input/output (I/O) device interface 160, and a network interface 165, all of which are communicatively coupled, directly or indirectly, for inter-component communication via a memory bus 115, an I/O bus 120, and an I/O device interface 125.

The computer system 100 may contain one or more general purpose programmable central processing units (CPUs) 105A, 105B, 105C, and 105D (also known as processor cores), generically referred to herein as the processor 105. In some embodiments, the computer system 100 includes multiple processors 105, each having multiple processor cores, e.g., 105A-105D. In other embodiments, the computer system 100 includes a single processor 105 having multiple processor cores. The number of processor cores may vary, according to various embodiments. In some embodiments, the computer system 100 may contain multiple processors typical of a relatively large system. Each processor 105 may execute instructions stored in the memory 110 and may include one or more levels of onboard cache.

The memory 110 may include a random-access semiconductor memory, storage device, or storage medium (either volatile or non-volatile) for storing or encoding data and programs. In other embodiments, the memory 110 represents the entire virtual memory of the computer system 100, and also includes the virtual memory of other computer systems coupled to the computer system 100 or connected via the communications network 130. The memory 110 may be conceptually a single monolithic entity or may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors.

The memory 110 is illustrated as including a plurality of threads 185 managed by a hypervisor 170. Although the threads 185 and the hypervisor 170 are illustrated as being contained within the memory 110 in the computer system 100, in other embodiments, some or all of them may be on different computer systems and may be accessed remotely, e.g., via the communications network 130. The computer system 100 may use virtual addressing mechanisms that allow the programs of the computer system 100 to behave as if they only have access to a large, single storage entity instead of access to multiple, smaller storage entities. While the threads 185 and the hypervisor 170 are illustrated as residing in the memory 110, these elements are not necessarily all completely contained in the same storage device at the same time.

Each of the threads 185 may correspond to an application and each application may have one or more threads. Any number of threads 185 may be supported, and the number of threads resident at any time in the computer system 100 may change dynamically as threads are added or removed from the computer system 100. Each of the threads 185 may include instructions that execute on the processor 105 in a separate or independent memory space. In various embodiments, the application corresponding to a thread may be a user application, a third-party application, or any portion, multiple, or combination thereof. The application may include instructions that execute on the processor 105 or statements that are interpreted by instructions that execute on the processor 105. Each of the applications may be the same or different from each other.

The memory 110 is illustrated as containing a global data structure 175 and a group data structure 180, as well as the hypervisor 170. Although the data structures 175 and 180 and the hypervisor 170 are illustrated as being contained within the memory 110 in the computer system 100, in other embodiments, some or all of them may be on different computer systems and may be accessed remotely, e.g., via the communications network 130. The computer system 100 may use virtual addressing mechanisms that allow the programs of the computer system 100 to behave as if they only have access to a large, single storage entity, instead of access to multiple, smaller storage entities. Thus, while the data structures 175 and 180 and the hypervisor 170 are illustrated as residing in the memory 110, these elements are not necessarily all completely contained in the same storage device at the same time. Further, although the hypervisor 170 and the data structures 175 and 180 are illustrated as being separate entities, in other embodiments, some of the entities, portions of the entities, or all of the entities may be packaged together.

Although the hypervisor 170 is illustrated as being within the memory 110, in other embodiments, all or a portion of the hypervisor 170 may be implemented in firmware or hardware. The hypervisor 170 may perform both low-level management functions, such as page table management, and may also perform higher-level management functions, such as creating, modifying, or deleting the group data 180, concurrent I/O maintenance, and allocating or deallocating processors, memory, and other hardware or program resources to or from the various threads 185. The hypervisor 170 may also control the allocation, locking, and unlocking of the shared resources to the threads 185, ensuring coherency of the data within the computer system.

The hypervisor 170 may statically and/or dynamically allocate a portion of the available resources in the computer system 100 to each thread 185. For example, each thread 185 may be allocated one or more of the processors 105 and/or one or more hardware threads on which to execute, as well as a portion of the available memory space to access. In some embodiments, a plurality of threads 185 may execute on a single processor core, e.g., processor core 105A. The threads 185 may share specific program and/or hardware resources such as the processor 105, such that a given resource may be utilized by more than one thread 185. Alternatively, program and hardware resources may be allocated to only one thread 185 at a time. Additional resources, e.g., mass storage, backup storage, user input, network connections, and the corresponding I/O adapters, are typically allocated to one or more of the threads 185. Resources may be allocated to multiple logical threads 185 sharing resources on the same bus. Some resources may be allocated to multiple threads 185 at a time. The resources identified herein are examples only, and any appropriate resource capable of being allocated may be used.

In some embodiments, the threads 185 and/or the hypervisor 170 may include instructions that execute on the processor 105 or statements that are interpreted by instructions executing on the processor 105 to perform the functions described herein. In other embodiments, the threads 185 and/or the hypervisor 170 may be implemented in microcode or firmware. In yet other embodiments, the hypervisor 170 may be implemented in hardware via logic gates, semiconductor devices, chips, circuits, circuit cards, and/or other physical hardware devices.

The memory bus 115 may provide a data communication path for transferring data among the processors 105, the memory 110, and the I/O device interface 125. The I/O device interface 125 may be further coupled to the I/O bus 120 for transferring data to and from the various I/O units. The I/O device interface 125 may communicate with multiple I/O interface units 140, 150, 160, and 165, which may also be known as I/O processors (IOPs) or I/O adapters (IOAs), through the I/O bus 120.

The I/O interface units 140, 150, 160, and 165 support communication with a variety of storage and I/O devices. For example, the terminal interface 140 supports the attachment of one or more user I/O devices 145, which may include user output devices (such as a video display device, projector, speaker, and/or television set) and user input devices (such as a camera, keyboard, mouse, keypad, touchpad, trackball, buttons, Radio Frequency Identifier tags, light pen, finger, stylus, or other pointing device). A user may manipulate the user input devices utilizing a user interface, in order to provide input data and commands to the user I/O device 145 and the computer system 100, and may receive output data via the user output devices. For example, a user interface may be presented via the user I/O device 145, such as displayed on a display device, played via a speaker, or printed via a printer.

The storage interface unit 150 supports the attachment of one or more disk drives or direct access storage devices 155 (which are typically rotating magnetic disk drive storage devices, although they could alternatively be other storage devices, including arrays of disk drives configured to appear as a single large storage device to a host computer). In another embodiment, the storage device 155 may be implemented via any type of secondary storage device. The contents of the memory 110, or any portion thereof, may be stored and retrieved from the storage device 155 as needed. The I/O device interface 160 provides an interface to any of various other input/output device or devices of other types, such as printers or fax machines. The network interface 165 provides one or more communications paths from the computer system 100 to other digital devices and computer systems 135. Such paths may include, for example, one or more communications networks 130.

Although the memory bus 115 is shown in FIG. 1 as a relatively simple, single bus structure providing a direct communication path among the processors 105, the memory 110, and the I/O device interface 125, the memory bus 115 may in fact include multiple different buses or communications paths, which may be arranged in any of various forms, such as point-to-point links in hierarchical, star or web configurations, multiple hierarchical buses, parallel and redundant paths, or any other appropriate type of configuration. Furthermore, while the I/O device interface 125 and the I/O bus 120 are shown as single respective units, the computer system 100 may, in fact, contain multiple I/O device interfaces 125 and/or multiple I/O buses 120. While multiple I/O interface units are shown, which separate the system I/O bus 120 from various communication paths running to the various I/O devices, in other embodiments, some or all of the I/O devices may be directly connected to one or more system I/O buses.

In some embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, pager, automobile, teleconferencing system, appliance, or any other appropriate type of electronic device.

The communications network 130 may be any suitable bus, network, or any combination thereof, and may support any appropriate protocol suitable for communication of data and/or code to/from the computer system 100 and the client computer 135. In some embodiments, the communications network 130 may represent a storage device or a combination of storage devices, either connected directly or indirectly to the computer system 100. In other embodiments, the communications network 130 may support wireless communications. In yet other embodiments, the communications network 130 may support hard-wired communications, such as telephone line or cable. In some embodiments, the communications network 130 may be the Internet and may support Internet Protocol (IP). In other embodiments, the communications network 130 may be implemented as a local area network (LAN) or a wide area network (WAN). In yet other embodiments, the communications network 130 may be implemented as a hotspot service provider network. The communications network 130 may be implemented as an intranet. In some embodiments, the communications network 130 may be implemented as any appropriate cellular data network, cell-based radio network technology, or wireless network. In other embodiments, the communications network 130 may be implemented as any suitable bus, network, or combination thereof.

The client computer 135 may include some or all of the hardware and/or software elements of the computer system 100.

Figure 2:
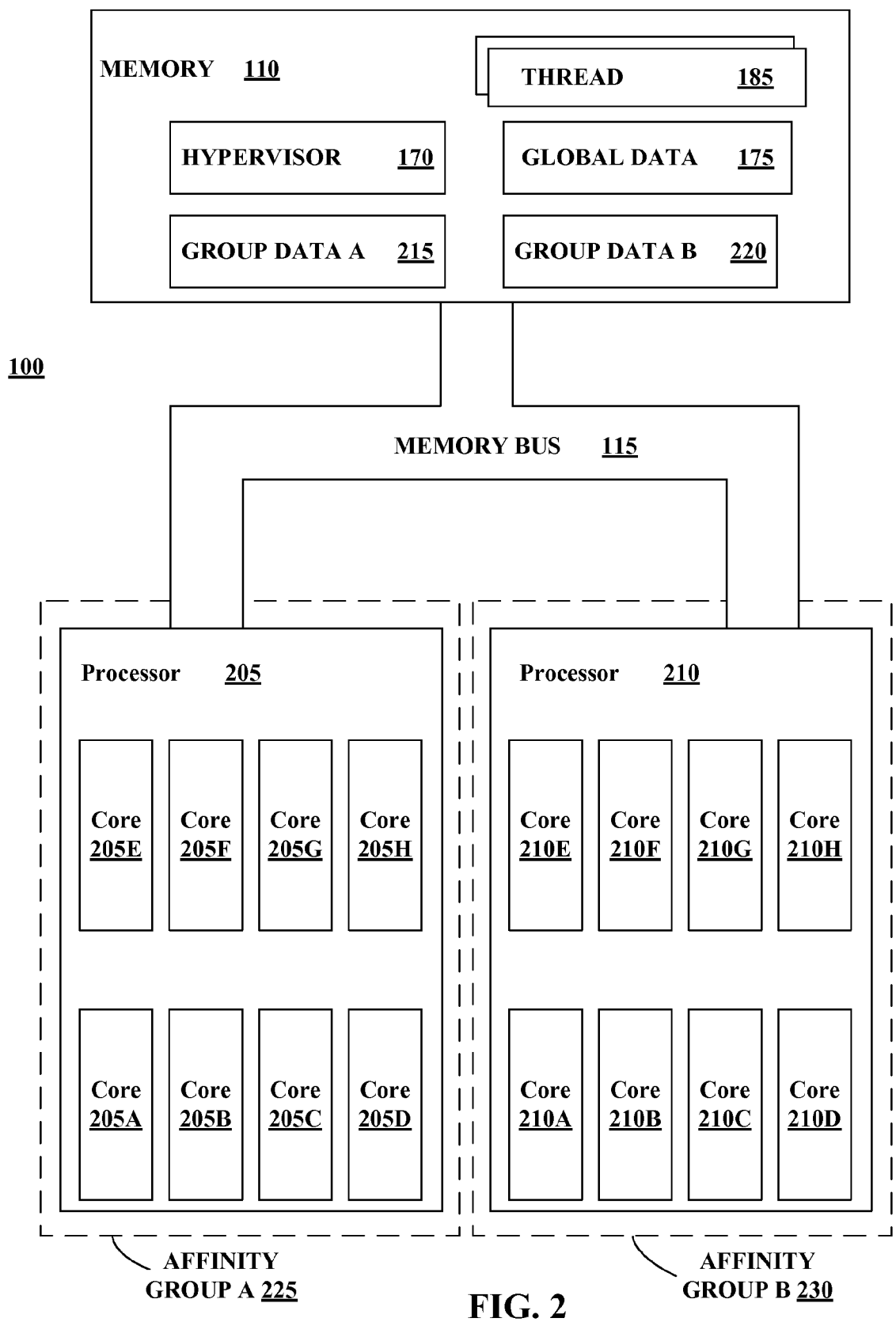
FIG. 2 illustrates a partial view of a symmetric multiprocessor (SMP) computer system configured to access group data structures, according to various embodiments.

FIG. 2 illustrates a more detailed view of the computer system 100 (FIG. 1), including a processor core grouping system, according to some embodiments. The processor core grouping system may, in some embodiments, include processors 205 and 210 and the memory 110 (FIG. 1). The processors 205 and 210 and the memory 110 may communicate with each other through the memory bus 115. The processors 205 and 210 may be similar to the processor 105 (FIG. 1) described above. The memory 110 may include the hypervisor 170, the global data structure 175, one or more threads 185, a group data structure A 215, and a group data structure B 220. While the embodiment of FIG. 2 is shown with two processors 205 and 210, and corresponding group data structures 215 and 220 respectively, other embodiments may include a different configuration of processors and a different configuration of group data structures (see FIG. 3 below for an example).

In some embodiments, processor 205 includes eight processor cores, 205A-205H, and processor 210 includes eight processor cores, 210A-210H. In other embodiments, processors 205 and 210 include a different number of processor cores than illustrated in FIG. 2. Processors 205 and 210 may include one or more levels of onboard cache. Processor 205 and processor 210 may be configured to correspond to different affinity groups by the hypervisor 170. In the illustrated embodiment, processor 205 corresponds to affinity group A 225 and processor 210 corresponds to affinity group B 230.

Each affinity group 225, 230 may be associated with a corresponding group data structure in the memory 110. For example, in the illustrated embodiment, the two processors each represent an affinity group, i.e., processor 205 and processor cores 205A-205H represent one affinity group (affinity group A 225) while processor 210 and processor cores 210A-210H represent another affinity group (affinity group B 230). Each affinity group 225, 230 has a corresponding group data structure, group data A 215 corresponds to processor 205 and affinity group A 225 and group data B 220 corresponds to processor 210 and affinity group B 230. Both affinity groups 225, 230 may communicate with the memory 110 through the memory bus 115.

In some embodiments, group data structure A 215 and group data structure B 220 contain data that corresponds to the global data 175. A single group data structure may correspond to a single affinity group. In some embodiments, a single group data structure corresponds to a single processor. In other embodiments, a single group data structure corresponds to a plurality of processors. Both group data structures 215, 220 may include copies of the global data 175. In other embodiments, the group data structures 215, 220 may contain hints about the state of the global data 175. For example, the global data 175 may contain a bit map that maintains information about resource utilization, such as which processor cores are idle and which processor cores are currently utilized. In such an embodiment, the group data structures 215, 220 may contain a hint such as a bit that identifies whether any processor cores are idle. The group data structures 215, 220 may be read by the processors 205, 210 in their corresponding affinity groups substantially more frequently than the global data 175 is modified. The group data structures 215, 220 may be updated by a producer executing on a processor core when that producer modifies the global data 175, according to some embodiments. The process of reading the group data structures 215, 220 and modifying the global data 175 is discussed in further detail in accordance with FIGS. 4-6 below.

One or more threads 185 execute on a processor core, e.g., processor core 205A, according to various embodiments. The threads may be consumers, producers, or combinations thereof. Each of the one or more threads 185 may be concurrently reading (a consumer) the group data structure, e.g., group data structure 215, corresponding to the affinity group to which the processor core they are executing on belongs. The threads 185 may be executing on the same processor core, i.e., a plurality of threads 185 executing on processor core 205A, or the threads 185 may be executing on a plurality of processor cores, e.g., processor cores 205A-205H, corresponding to a particular affinity group, e.g., affinity group A 225.

Figure 3:
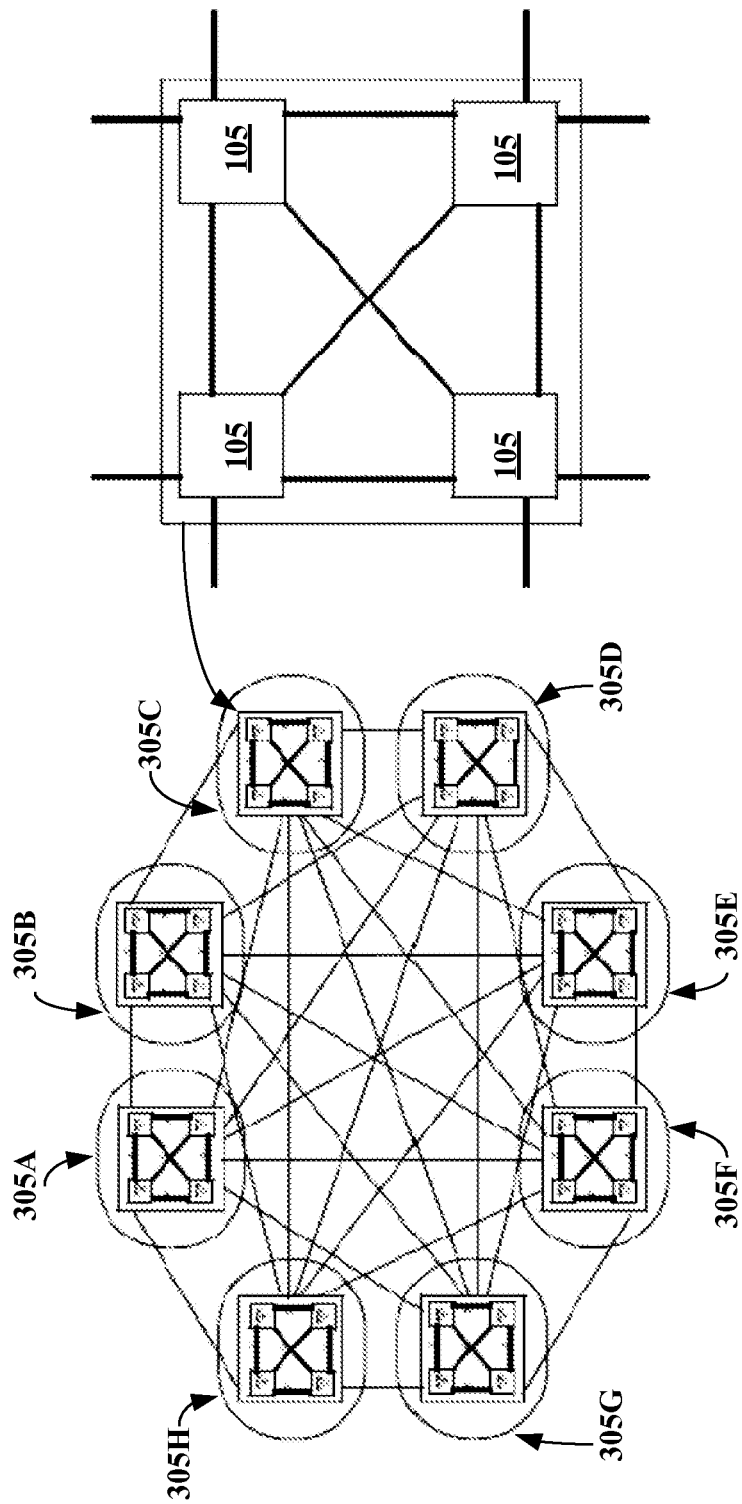
FIG. 3 illustrates a configuration of processors in an SMP computer system grouped according to performance variations, according to various embodiments.

FIG. 3 illustrates a topology of an SMP computer system with processors grouped based on performance variations, according to various embodiments. FIG. 3 illustrates how processors may be divided into affinity groups based on a cache coherency protocol. As illustrated, the topology of an SMP computer system includes 32 processors 105. As described above, each processor 105 may have multiple processor cores. The depicted connections between the processors 105 represent the SMP fabric which allows for inter-processor communication. Each processor 105 in FIG. 3 may represent a processor chip. Affinity groups 305A-305H may be based on performance. For example, each of the affinity groups 305A-305H may include four processors 105. Performance of an SMP computer system may start to decrease when a processor 105 shares a cached version of data from memory (e.g., memory 110 (FIG. 1)) with a processor that is outside of its affinity group. For example, if a processor 105 in affinity group 305B were to share a cached version of data with a processor 105 in affinity group 305A, the performance may be less desirable than the performance by separating the processors into different affinity groups.

Figure 4:
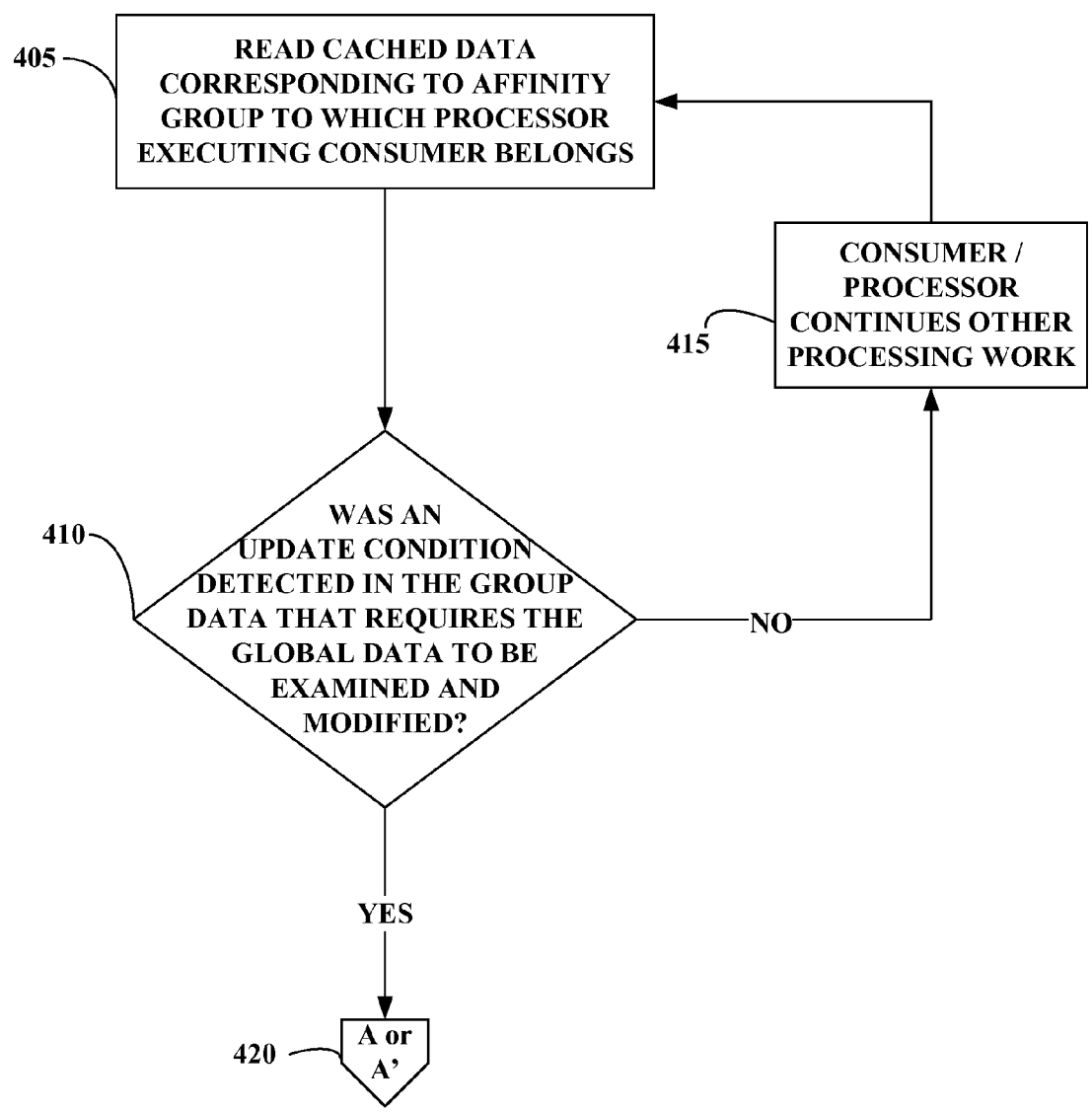
FIG. 4 illustrates a method to read data from a group data structure corresponding to a particular affinity group in an SMP computer system, according to various embodiments.

FIG. 4 illustrates a method 400 to read data from a group data structure corresponding to a particular affinity group of processor cores in an SMP computer system, according to some embodiments. The method 400 may represent the method a consumer follows to read a piece of data. As described above, a consumer is any thread of execution that is reading data. The method 400 may also include the process of a consumer becoming a producer, i.e., a consumer may first read data and then decide to write data as a result of the value of the data read.

The method 400 may begin with operation 405. At operation 405, a consumer, e.g., thread 185 (FIG. 2), may read the cached version of the global data, i.e., the group data structure, corresponding to the affinity group to which the processor core executing the thread belongs, e.g., group data A 215 (FIG. 2) for processor core 205A. The consumer may read the group data according to known methods, i.e., first read from the cache, and if not present read from the memory, e.g., memory 110 (FIG. 2).

After the consumer has read the group data, the consumer may, at operation 410, determine whether a condition exists that requires an update to the global data, e.g., global data 175 (FIG. 2). The condition may depend upon the type of data the consumer is accessing. Generally, the condition may be any condition that, if true, requires an update to the global data. For example, if the global data contains a bit map storing information about whether or not processor cores are idle, the condition may be such that if a consumer reads the group data and determines a processor core is idle, an update to the bit map may be necessary.

If, at operation 410, no condition exists that requires an update to the global data, then the processor core may continue executing other work, shown in operation 415. If, however, at operation 410 a condition exists that requires an update to the global data, the consumer may become a producer and modify the global data. At operation 420, the consumer may become a producer, which is described in greater detail in accordance with FIGS. 5 and 6 below. Operation 420 is shown as potentially leading to A or A', which correspond to FIG. 5 and FIG. 6 respectively and represent alternative embodiments of a method in which a producer writes data to a global data structure, e.g., global data 175.

Figure 5:
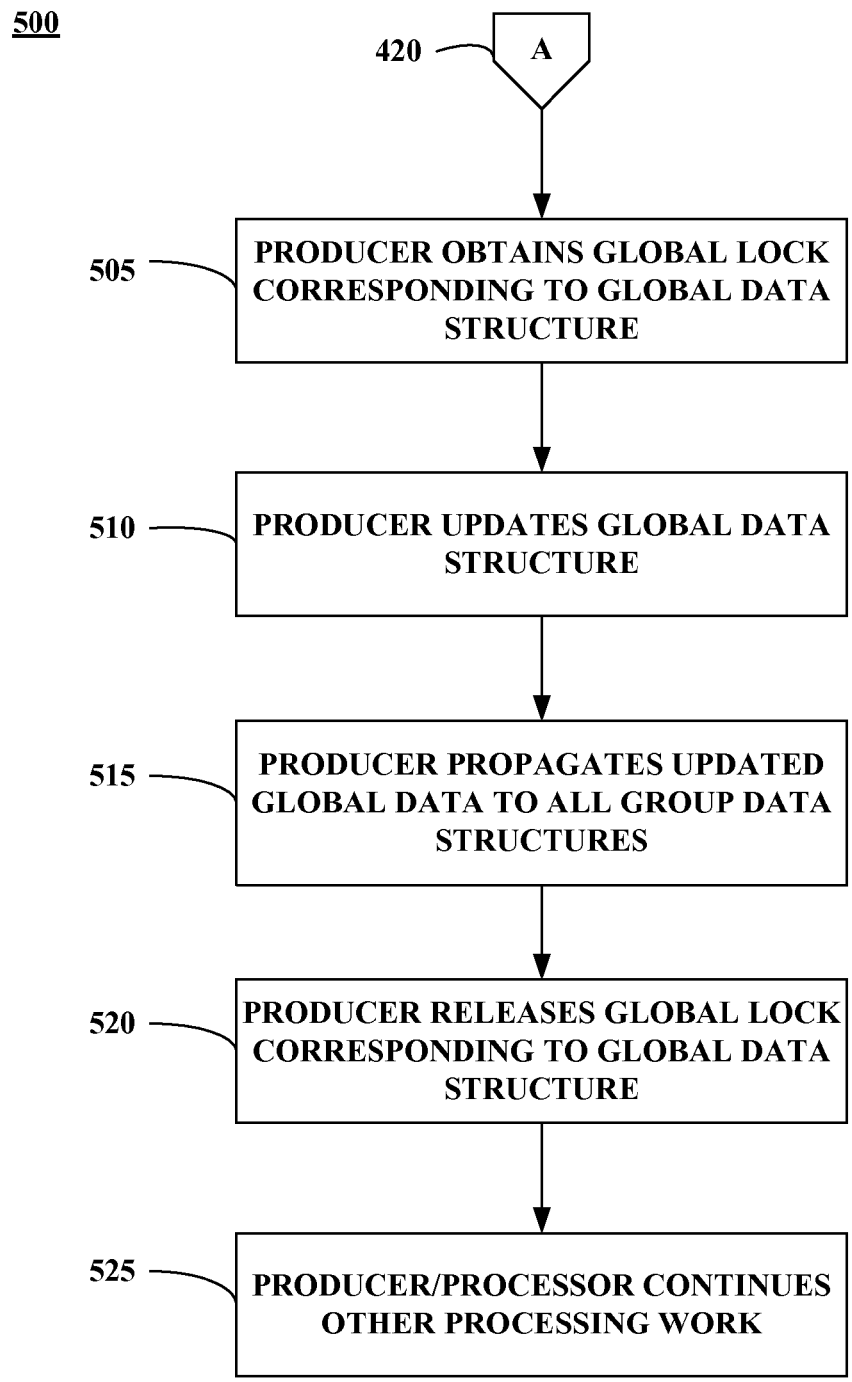
FIG. 5 illustrates a method to write data to a global data structure in an SMP computer system, according to various embodiments.

FIG. 5 illustrates a method 500 to write data to a global data structure, according to an embodiment. The method 500 may continue from the decision-making in operation 415 (FIG. 4). The method 500 may represent the method a producer, e.g., thread 185 (FIG. 2) follows to write to global data, e.g., global data 175 (FIG. 2).

The method 500 may begin with operation 505, in which the producer that is writing data to the global data obtains a lock on the global data. The "lock" of operation 505 may allow the producer to update the global data and prevent other producers from concurrently writing data to the global data structure. Though there is no lock on the group data structures, because the lock on the global data prevents multiple concurrent updates, the updates to the group data structures are serialized as well. In some embodiments, the lock may be any locking construct in the SMP computer system. For example, in some embodiments, the lock may be a software construct, such as a semaphore.

Once the producer has obtained the lock on the global data in operation 505, the method 500 may continue in operation 510 with the producer updating the global data. Once the producer has updated the global data, the producer may update all group data structures in operation 515. In some embodiments, a management thread of the hypervisor 170 may update the group data structures. The producer will have to update N group data structures, where N represents the number of affinity groups in the computer system. In some embodiments, there may be no lock associated with the group data structures. In such embodiments, the lock on the global data structure may prevent other producers from updating the group data structures as well.

Once the producer has updated all of the group data structures, the producer may release the lock on the global data structure in operation 520. To prevent multiple concurrent updates and potential inconsistency between the global data and the group data, the global lock may not be released until operation 515 is complete. In operation 525, following the release of the lock in operation 520, the producer may continue doing other work. In some embodiments, if the producer has no other work, the processor core on which it was executing may continue doing work with other threads of execution.

Figure 6:
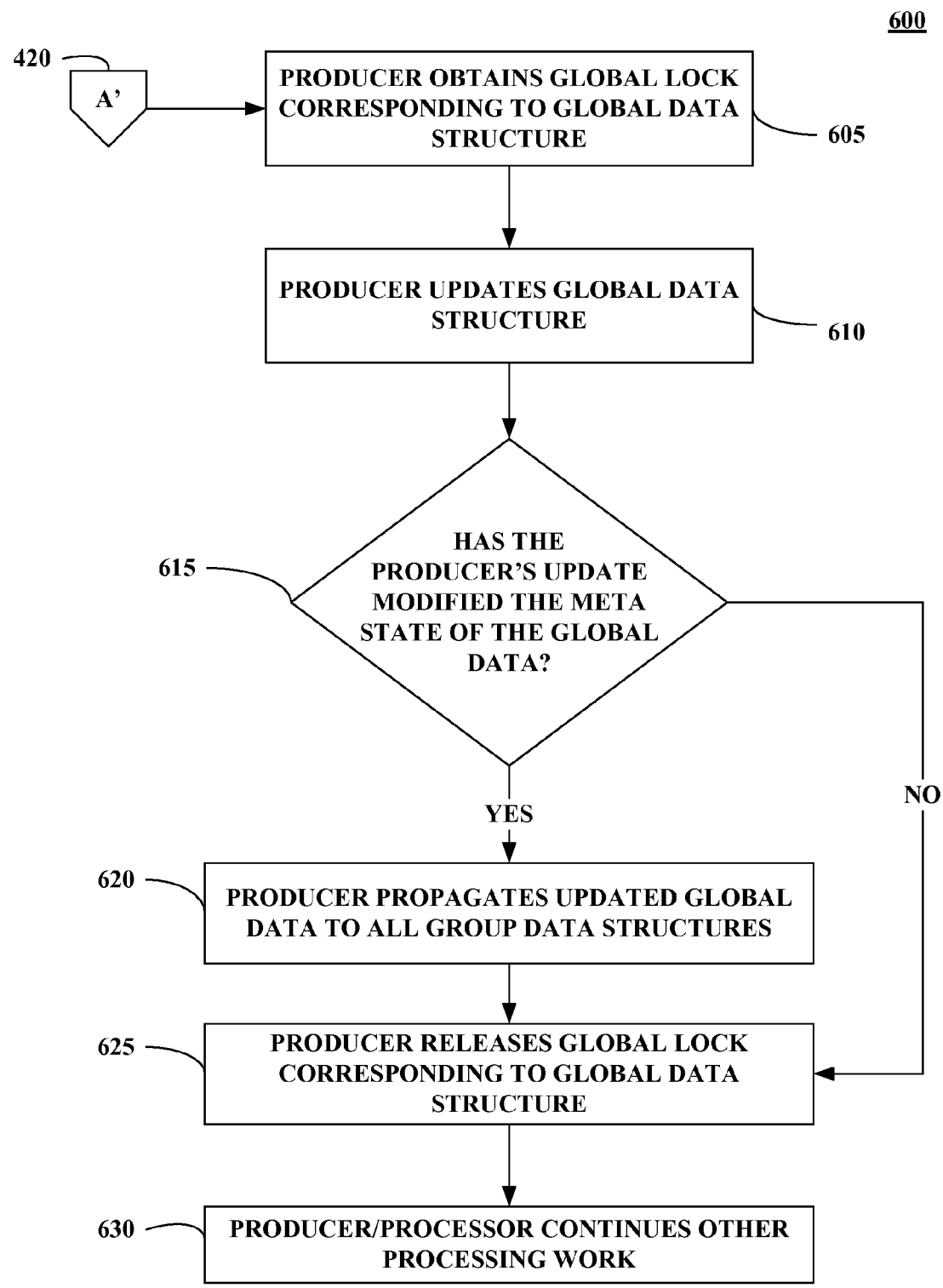
FIG. 6 illustrates an alternative method to write data to a global data structure in an SMP computer system, according to various embodiments.

FIG. 6 illustrates a method 600 to write data to a global data structure, according to an alternative embodiment. The method 600 may continue from the decision-making in operation 415 (FIG. 4). The method 600 may represent the method a producer, e.g., thread 185 (FIG. 2) follows to write to global data, e.g., global data 175 (FIG. 1). The method 600 may be an alternative embodiment of the method 500.

The method 600 may begin with operation 605, in which the producer that is writing data to the global data obtains a lock on the global data. The "lock" of operation 605 may allow the producer to update the global data and prevent other producers from writing data to the global data structure at the same time. Though there is no lock on the group data structures, because the lock on the global data prevents multiple concurrent updates, the updates to the group data structures are serialized as well. In some embodiments, the lock may be any locking construct in the SMP computer system. For example, in some embodiments, the lock may be a software construct, such as a semaphore.

Once the producer has obtained the lock on the global data in operation 605, the method 600 may continue in operation 610 with the producer updating the global data. Once the processor core has updated the global data in operation 610, operation 615 may continue with a determination of whether the update to the global data requires an update to the group data structures. The group data structures may only require an update if the update to the global data changed the meta state of the global data. The "meta state" may be the aggregate of the state of individual components of the data. For example, in an embodiment where the group data includes hints about the global data, not actual copies of the global data, the group data structures may only need to be updated when the modified global data is in a different meta state than the hint provided in the group data. In such an embodiment, if the global data contains a bit map of which processor cores in the SMP computer system are idle, the group data structures may include a hint such as whether there are any idle processor cores (based on the bit map in the global data structure). The hint may, for example, be generated by reading the global data and creating the hint based on a condition that provides information about the global data. In such an SMP computer system, the determination of operation 615 would evaluate to true if the modification of the bit map in the global data led to a change in the hint provided in the group data structures, e.g., the modification changed the hint to no there are no idle processor cores instead of yes there are idle processor cores.

If operation 615 yields a determination that the group data structures need to be updated, the producer having the global lock will propagate the new hints to all group data structures based on the modified global data. In some embodiments, a management thread of the hypervisor 170 may update the group data structures. If the group data structures do not need to be updated, the method will continue with operation 625.

Either after the updates to the group data structures were made, or after determining that the condition to update the group data structures has not been met, the lock on the global data will be released in operation 625. Once the global lock is released, the producer may continue on to doing other work in operation 630. If there is no other work for the producer, the processor core may continue on to doing work with other threads of execution in operation 630.

The various program components implementing various embodiments may be implemented in a number of manners, including using various computer applications, routines, components, programs, objects, modules, data structures, etc., and are referred to herein as "computer programs," or simply "programs."

The computer programs may include one or more instructions or statements that are resident at various times in various memory and storage devices in the computer system 100 and that, when read and executed by one or more processors in the computer system 100, or when interpreted by instructions that are executed by one or more processors, may cause the computer system 100 to perform the actions necessary to execute steps or elements including the various embodiments of this disclosure. Embodiments of the present disclosure may be embodied as a system, method, or computer program product. Accordingly, embodiments of the present disclosure may take the form of an entirely hardware embodiment, an entirely software embodiment (including firmware, resident software, micro-code, etc., which are stored in a storage device), or an embodiment combining software and hardware aspects that may all generally be referred to herein as a "circuit," "module," or "system." Furthermore, embodiments of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination thereof. More specific examples (a non-exhaustive list) of the computer-readable storage media may include: an electrical connection having one or more wires, a portable computer diskette, a hard disk (e.g., the storage device 155), a random access memory (RAM) (e.g., the memory 110), a read-only memory (ROM), an erasable programmable read-only memory (EPROM) or Flash memory, an optical fiber, a portable compact disc read-only memory (CD-ROM), an optical storage device, a magnetic storage device, or any suitable combination thereof. In the context of this disclosure, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by, or in connection with, an instruction execution system, apparatus, or device. Program code embodied on a computer-readable medium may be transmitted using any appropriate medium, including but not limited to wireless, wire line, optical fiber cable, Radio Frequency, or any suitable combination thereof.

Computer program code for carrying out operations for aspects of embodiments of the present disclosure may be written in any combination of one or more programming languages, including object oriented programming languages and conventional procedural programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure have been described with reference to flowchart illustrations, block diagrams, or both, of methods, apparatuses (systems), and computer program products. Each block of the flowchart illustrations and/or block diagrams, and combinations of blocks in the flowchart illustrations and/or block diagrams, may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer programs defining the functions of various embodiments may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions or acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustrations, can be implemented by special purpose hardware-based systems that perform the specified functions or acts, or combinations of special purpose hardware and computer instructions.

Embodiments may also be delivered as part of a service agreement with a client corporation, nonprofit organization, government entity, or internal organizational structure. Aspects of these embodiments may include configuring a computer system to perform, and deploying computing services (e.g., computer-readable code, hardware, and web services) that implement some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment. But, any particular program nomenclature used herein is used merely for convenience, and thus embodiments are not limited to use solely in any specific application identified and/or implied by such nomenclature. The exemplary embodiments are not intended to limit the present disclosure. Other alternative hardware and/or program environments may be used without departing from the scope of the disclosure.

The terminology used herein is for the purpose of describing particular embodiments only and is not intended to be limiting. As referred to herein, the singular forms "a," "an," and "the" are intended to include the plural forms as well, unless the context clearly indicates otherwise. It will be further understood that the terms "includes" and/or "including," when used in this Specification, specify the presence of the stated features, integers, steps, operations, elements, and/or components, but does not preclude the presence or addition of one or more other features, integers, steps, operations, elements, components, and/or groups thereof. In the previous detailed description of exemplary embodiments, reference was made to the accompanying drawings (where like numbers represent like elements), which form a part hereof, and in which is shown by way of illustration specific exemplary embodiments in which the embodiments may be practiced. These embodiments were described in sufficient detail to enable those skilled in the art to practice the embodiments, but other embodiments may be utilized and logical, mechanical, electrical, and other changes may be made without departing from the scope of the present disclosure. In the previous description, numerous specific details were set forth to provide a thorough understanding of embodiments. Embodiments, however, may be practiced without these specific details. In other instances, well-known circuits, structures, and techniques have not been shown in detail in order not to obscure embodiments.

Different instances of the word "embodiment" as used within this Specification do not necessarily refer to the same embodiment, but they may. Any data and data structures illustrated or described herein are exemplary, and in other embodiments, different amounts of data, types of data, fields, numbers and types of fields, field names, numbers and types of rows, records, entries, or organizations of data may be used. In addition, any data may be combined with logic so that a separate data structure may not be necessary.

While the foregoing is directed to exemplary embodiments, other and further embodiments of the disclosure may be devised without departing from the basic scope thereof, and the scope thereof is determined by the claims that follow.

What is claimed is:

1. A method of managing data in a symmetric multiprocessor computer with a plurality of processor cores sharing global data, the method comprising:
   grouping the plurality of processor cores into a plurality of affinity groups;
   copying the global data from a global data structure into each of a plurality of group data structures in a memory, each group data structure corresponding to an affinity group of the plurality of affinity groups, the plurality of group data structures providing read access to the global data for threads executing on processor cores in the corresponding affinity group, the plurality of group data structures are duplicates of each other;
   reading from a first of the plurality of group data structures corresponding to a first of the affinity groups, by a first thread executing on a first processor core, based on the first processor core being associated with the first of the affinity groups;
   determining to modify the global data;
   obtaining, in response to the determining to modify the global data, a lock on the global data structure by the first thread, wherein the lock on the global data structure prevents a thread other than the first thread from updating the global data; and
   modifying, in response to the obtaining the lock and prior to modifying any of the plurality of group data structures based on the determining to modify the global data, the global data in the global data structure to create a modified global data.

2. The method of claim 1, further comprising:
   updating each of the plurality of group data structures with the modified global data.

3. The method of claim 1, wherein the grouping the plurality of processor cores further comprising:
   determining a metric describing latency to access memory; and
   grouping the plurality of processor cores based on the metric.

4. The method of claim 1, wherein the grouping the plurality of processor cores further comprising:
   determining a metric describing performance of a cache coherency protocol; and
   grouping the plurality of processor cores based on the metric.

5. The method of claim 1, further comprising:
   reading the first of the plurality of group data structures corresponding to the first of the affinity groups by a second thread executing on a second processor core associated with the first of the affinity groups.

6. The method of claim 5, wherein the first and second threads include a plurality of threads.

7. A method of managing data in a symmetric multiprocessor computer with a plurality of processor cores sharing global data, the method comprising:
   grouping the plurality of processor cores into a plurality of affinity groups, the grouping based on a metric describing latency to access memory;
   copying the global data from a global data structure into each of a plurality of group data structures in a memory, each group data structure corresponding to an affinity group of the plurality of affinity groups, the plurality of group data structures providing read access to the global data for threads executing on processor cores in the corresponding affinity group, the plurality of group data structures are duplicates of each other;

reading from a first of the plurality of group data structures corresponding to a first of the affinity groups, by a first thread executing on a first processor core, based on the first processor core being associated with the first of the affinity groups;

determining, based on the reading, to modify the global data;

obtaining, in response to the determining to modify the global data, a lock on the global data structure by the first thread, wherein the lock on the global data structure prevents a thread other than the first thread from updating the global data;

modifying, in response to the obtaining the lock and prior to modifying any of the plurality of group data structures based on the determining to modify the global data, the global data to create a modified global data; and updating each of the plurality of group data structures with the modified global data.

* * * * *